(12) United States Patent
Miyazaki

(10) Patent No.: US 7,832,539 B2
(45) Date of Patent: Nov. 16, 2010

(54) MULTIPLE DISC CLUTCH APPARATUS

(75) Inventor: Tomoyuki Miyazaki, Kakegawa (JP)

(73) Assignee: NSK-Warner K. K., Tokyo (JP)

( * ) Notice: Subject to any disclaimer, the term of this patent is extended or adjusted under 35 U.S.C. 154(b) by 379 days.

(21) Appl. No.: 11/337,476

(22) Filed: Jan. 24, 2006

(65) Prior Publication Data
US 2006/0163022 A1    Jul. 27, 2006

(30) Foreign Application Priority Data
Jan. 26, 2005    (JP) ............................. 2005-018907

(51) Int. Cl.
*F16D 25/0638*    (2006.01)
(52) U.S. Cl. .............. 192/85.25; 192/85.42; 192/109 R
(58) Field of Classification Search ............. 192/85 AA, 192/109 R, 106 F, 85.39, 85.41, 85.42, 85.25
See application file for complete search history.

(56) References Cited

U.S. PATENT DOCUMENTS 6,716,128 B2 *    4/2004   Kuramoto et al. ....... 192/85 AA
6,840,363 B2 *    1/2005   Braford et al. ........... 192/70.12
2003/0188950 A1 * 10/2003  Kinoshita et al. ....... 192/109 R

FOREIGN PATENT DOCUMENTS

| JP | 59-110431 | 7/1984 |
|----|-----------|--------|
| JP | 63-118427 | 7/1988 |
| JP | 03-009119 | 1/1991 |

* cited by examiner

Primary Examiner—David D Le
Assistant Examiner—Derek D Knight
(74) Attorney, Agent, or Firm—Miles & Stockbridge P.C.

(57) ABSTRACT

A multiple disc clutch apparatus in which driven plates and drive plates are arranged alternately to overlap with each other and which is arranged to be engaged or released in response to an action mode or a non-action mode switched over by the pressing force of a piston, comprises piston regulation means which regulates an amount of movement of the piston so that metallic plates forming the substrates of the driven plates and the drive plates do not adhere to each other.

6 Claims, 3 Drawing Sheets

MULTIPLE DISC CLUTCH APPARATUS

This application claims the benefit of Japanese Patent application No. 2005-018907 which is hereby incorporated by reference.

BACKGROUND OF THE INVENTION

1. Field of the Invention

The present invention relates to a multiple disc clutch apparatus which is capable of securely preventing adhesion between metallic plates serving as driven plates (SP) and drive plates (FP) when frictional members are lost.

2. Related Background Art

FIG. 5 is a schematic cross-sectional view of a multiple disc clutch apparatus according to a prior art. In this multiple disc clutch apparatus, several number of driven plates 1 (SP) and drive plates 2 (FP) are arranged alternately to overlap with each other. The driven plate 1 is a metallic plate having a spline on its outer periphery, while the drive plate 2 is a metallic plate having a spline on its inner periphery and facing members 3 (frictional members or linings) are attached onto both faces thereof. The multiple disc clutch is arranged to be engaged or released in an action mode or a non-action mode switched over by the pressing force of a piston 4. A reference numeral 5 denotes a clutch drum; 6 a retainer plate; 7 a canceller; and 8 a return spring, respectively.

Incidentally, when the frictional members of the multiple disc clutch are lost, it is feared that the metallic plates serving as the driven plates (SP) and the drive plates (FP) might be caused to adhere to each other.

In the conventional apparatus disclosed in Japanese Patent Application Laid-Open No. 3-9119, the thickness of the spline portion is set as larger than that of another portion. With this arrangement, the surface pressure acting on the spline portion is decreased, so as to prevent generation of friction.

However, in Japanese Patent Application Laid-Open No. 3-9119, since the spline portion of the driven plate is bent, the height of the spline portion is small, so that the spline portion is required to have a certain thickness in order to maintain heatmass, which may resultantly increase the cost since a bending process is required.

SUMMARY OF THE INVENTION

The present invention has been contrived taking such circumstances as described above into consideration, and an object thereof is to provide a multiple disc clutch apparatus which is capable of securely preventing adhesion between two metallic plates when frictional members are lost, with a simple mechanism at a low cost.

In order to achieve the above object, the present invention provides a multiple disc clutch apparatus in which driven plates and drive plates are arranged alternately to overlap with each other and which is arranged to be engaged or released in an action mode or a non-action mode switched over by the pressing force of a piston, and comprises piston regulation means for regulating an amount of movement of the piston so that metallic plates serving as the bases of the driven plates and the drive plates do not adhere to each other.

In the multiple disc clutch apparatus of the present invention, the piston regulation means is adapted to regulate an amount of movement of the piston and may include a snap ring provided in an inner diameter part of a sliding portion of the piston.

In the multiple disc clutch apparatus of the present invention, the piston regulation means is adapted to regulate an amount of movement of the piston and may include a canceller of the piston formed with a turn-back part.

In the multiple disc clutch apparatus of the present invention, the piston regulation means is adapted to limit a distance from the canceller and may include a projection formed on the piston.

In the multiple disc clutch apparatus of the present invention, the piston regulation means may include a hole formed through the outer diameter surface of the clutch drum to let oil pressure escape from through the hole when the piston moves beyond a predetermined range.

In the multiple disc clutch apparatus of the present invention, the regulated distance (X) of the piston is preferably expressed by a conditional formula:

$$C+n \cdot w < X < C+n \cdot t,$$

where X is the regulated distance, w is a normal amount of abrasion/surface, t is the thickness of a frictional member, n is the number of frictional surfaces, and C is a clutch clearance.

According to the present invention, it is intended to prevent adhesion in a simple mechanism at a low cost by providing a piston with a system for regulating movement thereof. Thus, it is possible for the piston to maintain a predetermined distance and prevent the piston from moving beyond a predetermined amount if the facing members of the drive plates are burned down (or lost), thereby preventing adhesion between the driven plates and the drive plates.

DETAILED DESCRIPTION OF THE MOST PREFERRED EMBODIMENTS

A multiple disc clutch apparatus according to an embodiment of the present invention will be described below with reference to drawings.

First Embodiment

Figure 1:
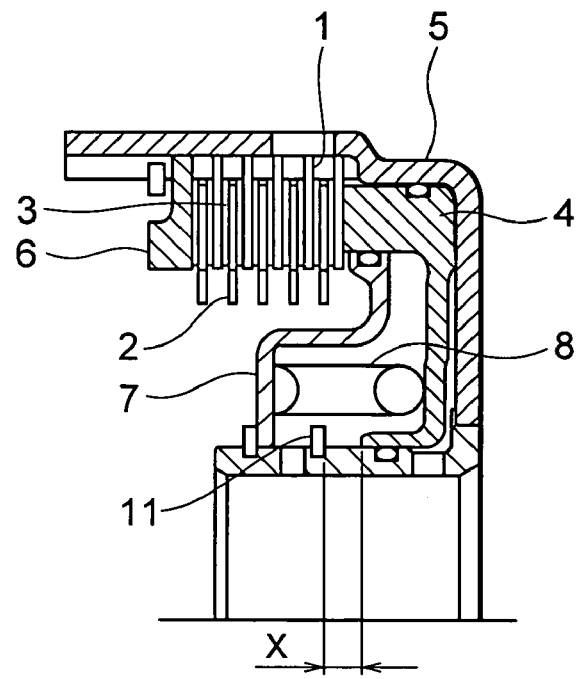
FIG. 1 is a schematic cross-sectional view of a multiple disc clutch apparatus according to a first embodiment of the present invention.

FIG. 1 is a schematic cross-sectional view of a multiple disc clutch apparatus according to a first embodiment of the present invention. In this multiple disc clutch apparatus, a several number of driven plates 1 (SP) and drive plates 2 (FP) are arranged alternately to overlap with each other. The driven plate 1 is a metallic plate having a spline on its outer side in the radial direction, while the drive plate 2 is a metallic plate having a spline on its inner side in the radial direction, and facing members 3 such as frictional members or linings are bonded onto both faces of the drive plate. Or, the facing members 3 such as frictional members or linings may be bonded onto one face of the driven plate 1 and that of the drive plate 2, alternately. The multiple disc clutch is arranged to be engaged or released in an action mode or a non-action mode switched over by the pressing force of a piston 4. A reference numeral 5 denotes a clutch drum; 6 a retainer plate; 7 a canceller; and 8 a return spring, respectively.

The present embodiment is provided with a piston regulation means for regulating an amount of movement of the piston 4 so as to prevent adhesion between the metallic plates forming the substrates of the driven plate 1 and the drive plate 2.

This piston regulation means is composed of a snap ring 11 provided in an inner diameter part of a sliding portion of the piston to regulate an amount of movement of the piston 4.

Accordingly, it is intended to prevent adhesion in a simple mechanism at a low cost by providing the piston with the snap ring 11 for restricting a movement thereof. Thus, it is possible, by the provision of the snap ring 11, for the piston to maintain a predetermined distance and prevent the piston 4 from moving in an exceeding amount if the facing members 3 of the drive plates 2 are burned down (or lost), thereby preventing adhesion between the driven plates 1 and the drive plates 2.

The regulated distance (X) of the piston is expressed by a conditional formula:

$$C+n \cdot w < X < C+n \cdot t,$$

where X is the regulated distance, w is a normal amount of abrasion/surface, t is the thickness of a frictional member, n is the number of frictional surfaces, and C is a clutch clearance.

Second Embodiment

Figure 2:
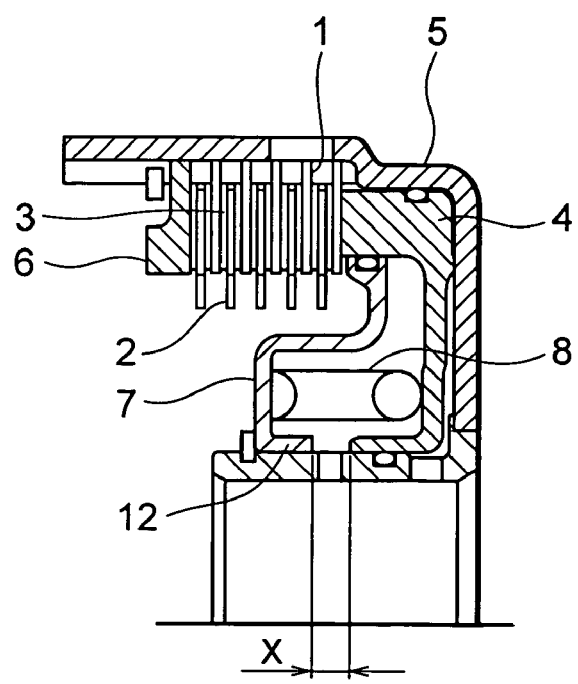
FIG. 2 is a schematic cross-sectional view of a multiple disc clutch apparatus according to a second embodiment of the present invention.

FIG. 2 is a schematic cross-sectional view of a multiple disc clutch apparatus according to a second embodiment of the present invention.

The basic structure of the second embodiment is substantially the same as that of the foregoing first embodiment, so that only a different point therefrom will be described.

The piston regulation means is arranged to regulate an amount of movement of the piston 4 and is composed of a canceller 7 of the piston 4 formed with a turn-back part 12.

Accordingly, also in this embodiment, it is intended to prevent adhesion in a simple mechanism at a low cost by providing the piston with the turn-back part 12 for regulating movement thereof. Thus, it is possible, by the provision of the turn-back part 12, to prevent the piston from moving in an exceeding amount and maintain a predetermined distance if the facing members 3 of the drive plates 2 are burned down or lost, and to prevent adhesion between the driven plates 1 and the drive plates 2.

The regulated distance (X) of said piston is expressed by a conditional formula:

$$C+n \cdot w < X < C+n \cdot t,$$

where X is the regulated distance, w is a normal amount of abrasion/surface, t is the thickness of a frictional member, n is the number of frictional surfaces, and C is a clutch clearance.

Note that other arrangements, operations and effects are the same as those of the foregoing embodiment.

Third Embodiment

Figure 3:
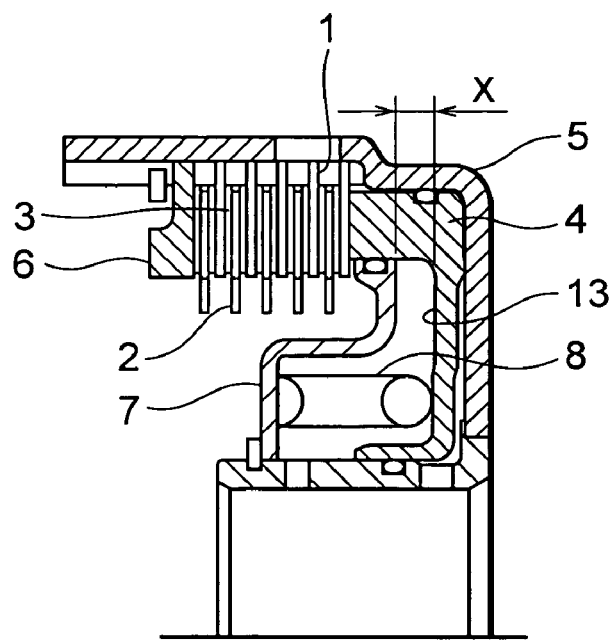
FIG. 3 is a schematic cross-sectional view of a multiple disc clutch apparatus according to a third embodiment of the present invention.

FIG. 3 is a schematic cross-sectional view of a multiple disc clutch apparatus according to a third embodiment of the present invention.

The basic structure of the third embodiment is substantially the same as those of the foregoing first and second embodiments, so that only a different point therefrom will be described.

The piston regulation means is arranged to limit a distance of piston from the canceller 7 by providing the piston 4 with a projection 13.

Accordingly, also in this embodiment, it is intended to prevent adhesion in a simple mechanism at a low cost by providing the piston 4 with the projection 13 for restricting a movement thereof. Thus, it is possible, by the provision of the projection 13, for the piston to maintain a predetermined distance and be prevented from moving in an exceeding amount if the facing members 3 of the drive plates 2 are burned down or lost, thereby preventing adhesion between the driven plates 1 and the drive plates 2.

The regulated distance (X) of the piston is expressed by a conditional formula:

$$C+n \cdot w < X < C+n \cdot t,$$

where X is the regulated distance, w is a normal amount of abrasion/surface, t is the thickness of a frictional member, n is the number of frictional surfaces, and C is a clutch clearance.

Note that other arrangements, operations and effects are the same as those of the foregoing embodiments.

Fourth Embodiment

Figure 4:
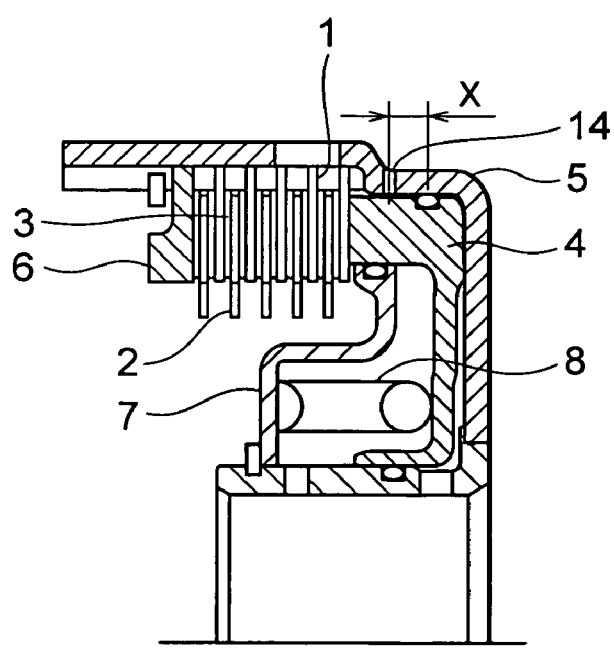
FIG. 4 is a schematic cross-sectional view of a multiple disc clutch apparatus according to a fourth embodiment of the present invention.
Figure 5:
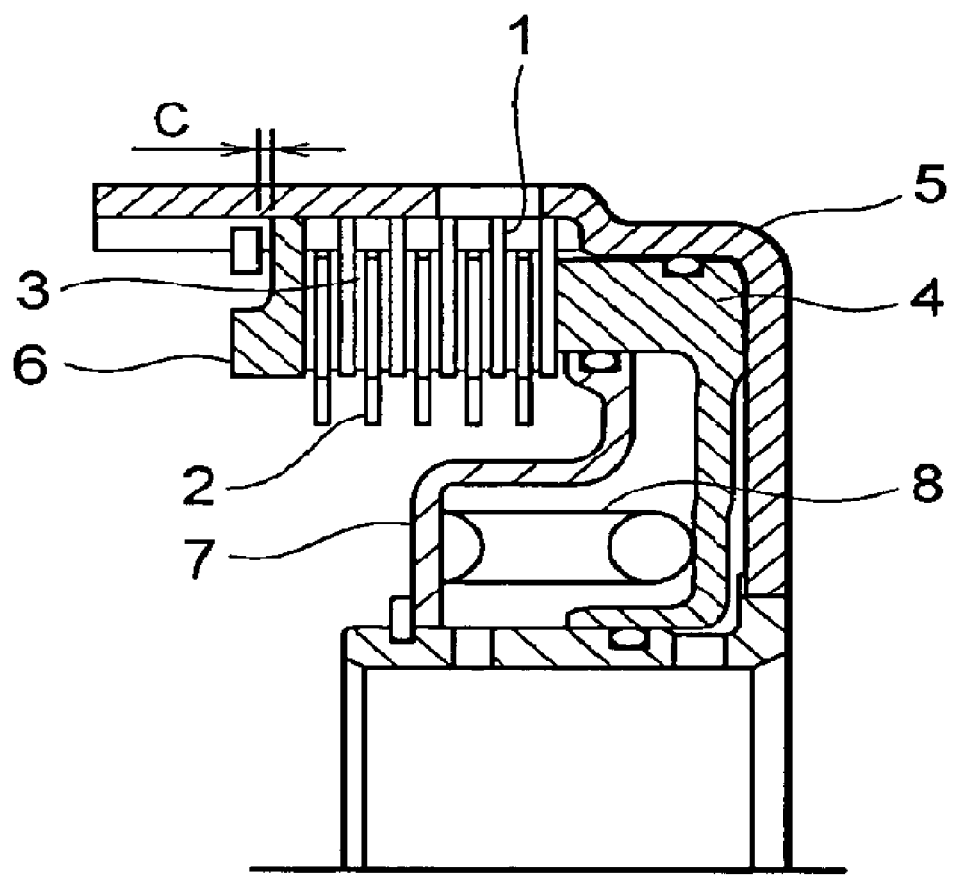
FIG. 5 is a schematic cross-sectional view of a multiple disc clutch apparatus according to the prior art.

FIG. 4 is a schematic cross-sectional view of a multiple disc clutch apparatus according to a fourth embodiment of the present invention.

The basic structure of the fourth embodiment is substantially the same as those of the foregoing embodiments, so that only a different point therefrom will be described.

The piston regulation means is composed of a hole 14 formed through the outer diameter surface of the clutch drum, and is arranged to let oil pressure escape from through the hole 14 when the piston 4 moves beyond a predetermined range.

Accordingly, also in this embodiment, it is intended to prevent adhesion in a simple mechanism at a low cost by providing the piston 4 with the hole 14 for oil pressure for restricting a movement thereof. Thus, it is possible, by the provision of the hole 14 for oil pressure, to prevent the piston 4 from moving in an exceeding amount and maintain a predetermined distance if the facing members 3 of the drive plates 2 are burned down or lost, thereby preventing adhesion between the driven plates 1 and the drive plates 2.

The regulated distance (X) of said piston is expressed by a conditional formula:

$$C+n \cdot w < X < C+n \cdot t,$$

where X is the regulated distance, w is a normal amount of abrasion/surface, t is the thickness of a frictional member, n is the number of frictional surfaces, and C is a clutch clearance.

Note that other arrangements, operations and effects are the same as those of the foregoing embodiments.

The present invention is not limited to the foregoing embodiments, but can be altered in various manners. It is needless to say that the present invention can be applied in a case where the directions of the spline of driven plate and that of the drive plate are reversed.

What is claimed is:

1. A multiple disc clutch apparatus in which driven plates and drive plates are arranged alternately to overlap each other with frictional members interposed therebetween, and which is arranged to be engaged or released in response to an action mode or a non-action mode switched over by the pressing force of a piston, comprising:

piston regulation means for regulating an amount of movement of the piston so that metallic plates forming substrates of the driven plates and the drive plates do not adhere to each other during engagement of the clutch apparatus in the event of a loss of frictional members; and a canceller disposed between an inner periphery of a radially outer end of the piston and the inner diameter part, wherein the piston regulation means includes a snap ring provided in an inner diameter part along a path of a sliding portion of said piston and the snap ring is disposed axially between a radially inner end of the piston and a radially inner end of the canceller.

2. The multiple disc clutch apparatus according to claim 1, wherein a regulated distance (X) of said piston is expressed by a conditional formula:

$$C+n \cdot w < x < C+n \cdot t,$$

where X is the regulated distance, w is a normal amount of abrasion/surface, t is the thickness of a frictional member, n is the number of frictional surfaces, and C is a clutch clearance.

3. A multiple disc clutch apparatus in which driven plates and drive plates are arranged alternately to overlap each other with frictional members interposed therebetween, and which is arranged to be engaged or released in response to an action mode or a non-action mode switched over by the pressing force of a piston, comprising:

a piston regulation device arranged to regulate an amount of movement of the piston so that metallic plates forming substrates of the driven plates and the drive plates do not adhere to each other during engagement of the clutch apparatus in the event of a loss of frictional members; and a canceller disposed between an inner periphery of a radially outer end of the piston and the inner diameter part, wherein the piston regulation device includes a snap ring provided in an inner diameter part along a path of a sliding portion of said piston and the snap ring is disposed axially between a radially inner end of the piston and a radially inner end of the canceller.

4. The multiple disc clutch apparatus according to claim 3, wherein a regulated distance (X) of said piston is expressed by a conditional formula:

$$C+n \cdot w < x < C+n \cdot t,$$

where X is the regulated distance, w is a normal amount of abrasion/surface, t is the thickness of a frictional member, n is the number of frictional surfaces, and C is a clutch clearance.

5. A multiple disc clutch apparatus comprising:

a clutch drum including an inner cylindrical portion, an outer cylindrical portion and a radially extending wall portion connecting the inner cylindrical portion and the outer cylindrical portion at an axial end of the clutch drum, the clutch drum being open at the other axial end;

driven plates and drive plates arranged axially, alternately within the outer cylindrical portion of the clutch drum so as to overlap each other with frictional members interposed therebetween;

an annular retainer plate disposed inside the outer cylindrical portion at an open end side of the clutch drum so as to limit axial movements of the driven plates and the drive plates;

an annular piston disposed within the outer cylindrical portion of the clutch drum and contacting an axially innermost one of the driven plates and the drive plates, the piston having a radially extending wall portion opposed to the radially extending wall portion of the clutch drum, a radially inner end of the radially extending wall portion of the piston being in sliding contact with an outer peripheral surface of the inner cylindrical portion of the clutch drum, and when the piston is moved axially toward the retainer plate, said driven plates and said drive plates are engaged to transmit torque therebetween, and when the piston is moved axially toward the radially extending wall portion of the clutch drum, said driven plates and said drive plates are released from each other;

an annular canceller fixedly disposed between an inner periphery of the piston and the outer peripheral surface of the inner cylindrical portion of the clutch drum;

a return spring disposed axially between the canceller and the radially extending wall portion of the piston so as to bias the piston toward the radially extending wall portion of the clutch drum; and a snap ring fixedly disposed on the outer peripheral surface of the inner cylindrical portion of the clutch drum axially between the radially inner end of the radially extending wall portion of the piston and the annular canceller so as to regulate an amount of movement of the piston such that metallic plates forming substrates of the driven plates and the drive plates do not adhere to each other during engagement of the clutch apparatus in the event of a loss of the frictional members.

6. The multiple disc clutch apparatus according to claim 5, wherein a regulated amount of movement (X) of said piston is expressed by a conditional formula:

$$C+n \cdot w < x < C+n \cdot t,$$

where X is the regulated amount of movement, w is a normal amount of abrasion/surface, t is the thickness of a frictional member, n is the number of frictional surfaces, and C is a clutch clearance.

* * * * *